(12) United States Patent
Mayes et al.

(10) Patent No.: US 8,505,745 B2
(45) Date of Patent: Aug. 13, 2013

(54) FOULING RESISTANT MEMBRANES FORMED WITH POLYACRYLONITRILE GRAFT COPOLYMERS

(75) Inventors: Anne M. Mayes, Mustang, OK (US); Ayse Asatekin Alexiou, Somerville, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 376 days.

(21) Appl. No.: 12/226,121

(22) PCT Filed: Apr. 10, 2007

(86) PCT No.: PCT/US2007/008797
§ 371 (c)(1),
(2), (4) Date: Jul. 15, 2009

(87) PCT Pub. No.: WO2007/120631
PCT Pub. Date: Oct. 25, 2007

(65) Prior Publication Data
US 2011/0198288 A1    Aug. 18, 2011

Related U.S. Application Data

(60) Provisional application No. 60/791,003, filed on Apr. 11, 2006.

(51) Int. Cl.
*B01D 39/00* (2006.01)
*B01D 39/14* (2006.01)
*B01D 67/00* (2006.01)
*C08F 30/08* (2006.01)

(52) U.S. Cl.
USPC ............ 210/500.35; 210/500.37; 210/500.23; 210/500.43; 210/490; 264/48; 526/279

(58) Field of Classification Search
USPC ................ 210/500.43, 490, 500.27, 500.35, 210/500.23; 264/48, 49; 526/279; 525/54.1
See application file for complete search history.

(56) References Cited

U.S. PATENT DOCUMENTS 3,091,810 A * 6/1963 Turner ............................ 425/3
3,472,766 A   10/1969 Rosenbaum
(Continued)

FOREIGN PATENT DOCUMENTS
JP      62-102801     5/1987
JP      61007961      7/1987
(Continued)

OTHER PUBLICATIONS

Garcia, M. Elizabeth F., et al., "*Polyacrylonitrile-graft-poly(ethylene oxide)*," Polymer Bulletin 37, 437-442 (1996).
(Continued)

*Primary Examiner* — Ana Fortuna
(74) *Attorney, Agent, or Firm* — Wolf, Greenfield & Sacks, P.C.

(57) ABSTRACT

The present application is generally directed towards polyacrylonitrile- (PAN-) based, amphophilic graft copolymers, for example, for the production of membranes for liquid filtration. In one aspect, the present invention provides systems and methods for preparing high flux, fouling resistant nanofiltration membranes whose pore size can be readily tuned. In some cases, microphase separation of a graft copolymer comprising a backbone comprising polyacrylonitrile (PAN) and hydrophilic side-chains is used. In some cases, nanochannels of tunable width are formed, which may give the membrane permselective properties and/or anti-fouling character. In some cases, a copolymer may be used as an additive in the immersion precipitation casting of ultrafiltration or microfiltration membranes. In certain instances, the additive can segregate to the membrane exterior and/or pore surfaces, e.g., due to favorable interactions between the hydrophilic side chains and the surrounding environment, which may create a surface that resists fouling, e.g., by biological molecules.

31 Claims, 8 Drawing Sheets

(56) References Cited

U.S. PATENT DOCUMENTS

| | | | |
|---|---|---|---|
| 3,901,810 A * | 8/1975 | Brooks et al. | 210/500.28 |
| 4,224,465 A * | 9/1980 | Grosclaude et al. | 99/453 |
| 4,268,662 A * | 5/1981 | Sano et al. | 528/486 |
| 4,377,010 A * | 3/1983 | Fydelor et al. | 623/1.49 |
| 4,752,624 A * | 6/1988 | Kim et al. | 521/137 |
| 4,861,830 A | 8/1989 | Ward, Jr. | |
| 4,886,836 A | 12/1989 | Gsell et al. | |
| 5,028,332 A * | 7/1991 | Ohnishi | 210/500.34 |
| 5,037,902 A | 8/1991 | Harris et al. | |
| 5,066,401 A | 11/1991 | Muller et al. | |
| 5,151,464 A | 9/1992 | Yang | |
| 5,190,989 A | 3/1993 | Himori | |
| 5,281,337 A * | 1/1994 | Chou et al. | 210/654 |
| 5,350,805 A * | 9/1994 | Lin | 525/121 |
| 5,470,892 A | 11/1995 | Gupta et al. | |
| 5,480,953 A | 1/1996 | Sugaya et al. | |
| 5,720,969 A * | 2/1998 | Gentile et al. | 424/424 |
| 5,807,944 A * | 9/1998 | Hirt et al. | 526/279 |
| 6,150,459 A * | 11/2000 | Mayes et al. | 525/54.1 |
| 6,180,007 B1 * | 1/2001 | Gentile et al. | 210/500.23 |
| 6,207,749 B1 | 3/2001 | Mayes et al. | |
| 6,413,621 B1 | 7/2002 | Mayes et al. | |
| 6,509,098 B1 * | 1/2003 | Merrill et al. | 428/413 |
| 7,553,417 B2 * | 6/2009 | Waller et al. | 210/500.27 |
| 7,677,398 B2 * | 3/2010 | Belfer et al. | 210/500.38 |
| 7,868,087 B2 * | 1/2011 | Mayes et al. | 525/54.1 |
| 2001/0047959 A1 * | 12/2001 | Oishi et al. | 210/500.23 |
| 2002/0147282 A1 * | 10/2002 | Mayes et al. | 525/245 |
| 2002/0155311 A1 * | 10/2002 | Mayes et al. | 428/522 |
| 2005/0173341 A1 | 8/2005 | Salinaro | |
| 2011/0168630 A1 * | 7/2011 | Mayes et al. | 210/650 |

FOREIGN PATENT DOCUMENTS

| | | |
|---|---|---|
| JP | 05-111624 | 5/1993 |
| WO | WO 94/07931 | 4/1994 |
| WO | WO 98/08595 A2 | 3/1998 |
| WO | WO 98/08595 A3 | 3/1998 |
| WO | WO 99/52560 A1 | 10/1999 |
| WO | WO 99/54365 A1 | 10/1999 |
| WO | WO 02/22712 A2 | 3/2002 |
| WO | WO 02/22712 A3 | 3/2002 |
| WO | WO 03/092873 | 11/2003 |

OTHER PUBLICATIONS

Garcia, E., et al.."Polyacrylonitrile-graft-poly(ethylene oxide) 2. Membranes of polyacrylonitrile and polyacrylonitrile-graft-poly(ethylene oxide) blends for separation of watger/ethanol mixtures of pervaporation," *Polymer Bulletin*, 1996, pp. 519-523.

Miyama, H. et al., "Nonthrombogenicity of Polyacrylonitrile Graft Copolymers Containing Poly(ethylene oxide) and Dimethylamine Side Chains," *Journal of Bioactive and Compatible Polymers*, vol. 2, Jul. 1987.

Search Report for PCT/US2007/608797 issued Sep. 13, 2007.

Written Opinion PCT/US2007/608797 issued Sep. 13, 2007.

Official Communication in European Pat. Apl. Ser. No. 07755160.4 dated Dec. 1, 2011.

Office Action in Japanese Pat. Apl. Ser. No. 2009-505425 dated Oct. 28, 2011.

Hester et al., "Design and performance of foul-resistant poly(vinylidene fluoride) membranes prepared in a single-step by surface segregation", Journal of Membrane Science, vol. 202, pp. 119-135, 2002.

Arakawa, M., et al., "Antithrombogenicity of Polyacrylonitrile—Polyethyleneoxide Hollow Fiber Membrance Developed for Designing an Antithrombogenic Continuous Ultrafiltration System," Artificial Organs, vol. 16, No. 2, pp. 146-150 1992 (month unknown).

Asatekin et al., Antifouling nanofiltration membranes for membrane bioreactors from self-assembling graft copolymers, Journal of Membrane Science, 285 (2006) 81-89.

Beers et al., "The synthesis of densely grafted copolymers by atom transfer radical polymerization," Macromolecules, vol. 31, No. 26, pp. 9413-9415, 1998 (month not listed on reference).

Beihoffer et al., "Hydrophilic modification of engineering polymers," Polymer, vol. 27, pp. 1626-1632, Polymer, Oct. 1986.

Brandrup, J., et al., Editors, Polymer Handbook, Solubility Parameters of Main Chain C-N Polymers, Table 10, pp. VII/709 and 711, 1999 (month unknown).

Coleman, et al., "Polymer reviews—A practical guide to polymer miscibility," Polymer, vol. 31, No. 7, pp. 1187-1203, 1990 (month unknown).

Dasgupta, "Surface modification of polyolefins for hydrophilicity and bondability: ozonization and grafting hydrophilic monomers on ozonized polyolefins", Journal of Applied Polymer Science, vols. 41, pp. 233-248, 1990 (month not listed on reference).

Downes et al., "Modifications of the hydrophilicity of heterocyclic methacrylate copolymers for protein release", Biomaterials, vol. 16, No. 18, pp. 1417-1421, 1995 (month not listed on reference).

Gnanaraj, et al., "Studies on comb-like polymer blend with poly(ethylene oxide)-lithium perchlorate salt complex electrolyte," Polymer, 1997, vol. 38, pp. 3709-3712.

Hester et al., "Preparation of protein-resistant surfaces on poly(vinylidene fluoride) membranes via surface segregation", Macromolecules, vol. 32, pp. 1643-1650, 1999 (month not listed on reference).

Hopkinson, et al., Isotopic labelling and composition dependence of interaction parameters in polyethylene oxide/polymethyl methacrylate blends, Polymer, vol. 36, No. 18, pp. 3523-3531, 1995(month not listed on reference).

Israelachvili, Jacob N., et al. "Contact Angles on Chemically Heterogeneous Surfaces," Langmuir, vol. 5, p. 288-289, 1989(month not listed on reference).

Israels et al., "pH-controlled gating in polymer brushes", Macromolecules, vol. 27, pp. 6679-6682, 1994 (month not listed on reference).

Ito et al., "Interactions in Mixtures of Poly(ethylene oxide) and Poly(methyl methyacrylate)," Macromolecules, 1987, vol. 20, pp. 2213-2220.

Ito et al., "pH-sensitive gating by conformational change of a polypeptide brush grafted onto a porous polymer membrane", J.Am. Chem. Soc., 1619-1623, 1997 (month not listed on reference).

Ji, et al., "Self-Assembly and Surface Structure of an Amphiphilic Graft Copolymer, Polystyrene-graft-ω-Stearyl-Poly(ethylene oxide)," J. Colloid Interface Sci., 2000, vol. 224, pp. 255-260.

Kim, C. K., et al., The Changes of Membrane Performance with Polyamide Molecular Structure in the Reverse Osmosis Process, J. Memb. Sci., vol. 165, p. 189-199, 2000(month not listed on reference).

Mika et al., "A new class of polyelectrolyte-filled microfiltration membranes with environmentally controlled porosity", Journal of Membrane Science, vol. 108, pp. 37-56, 1995 (month not listed on reference).

Nunes, Suzana Pereira, et al., "Dense Hydrophilic Composite Membranes for Ultrafiltration," J. Memb. Sci., vol. 106, p. 49-56, 1995 (month not listed on reference).

Olivetti et al., Sol-gel synthesis of vanadium oxide within a block copolymer matrix, Chemistry of Materials, 18 (2006) 2828-2833.

Paik, Hyun-Jong, et al., Synthesis and Characterization of Graft Copolymers of Poly(vinyl chloride) with Styrene and (Meth)acrylates by Atom Transfer Radical Polymerization, Marcromol. Rapid Comm., vol. 19, p. 47-52, 1988(month not listed on reference).

Wagner, J., "Multilayer Flexible Packaging: Technology and Applications for the Food, Personal Care, and Over-The-Counter Pharmaceutical Industries, Chapter 12, Polymer Blending for Packaging Applications," 2010 (month unknown).

Walton et al., "Entropically driven segregation in blends of branced and linear polymers", Physical Review Letters, vol. 54, No. 3, pp. 2811-2815, Sep. 1996.

Wang et al., "Synthesis of EPDM-g-PMMA through atom transfer radical polymerization," Polymer, vol. 40, pp. 4515-4520, 1999 (month not listed on reference).

Office Action dated Oct. 6, 2010 in Australian Application No. 2007238841.

Translation of Office Action dated Nov. 2, 2010 in Chinese Application No. 200780017568.2.

Translation of Office Action received on Dec. 15, 2010 in Egyptian Application No. 1653/2008.
Translation of Office Action dated Dec. 6, 2012 in Japanese Application No. 2012-093901.

Official Communication in European Pat. Apl. Ser. No. 07755160.4 dated Feb. 13, 2013.

* cited by examiner

US 8,505,745 B2

FOULING RESISTANT MEMBRANES FORMED WITH POLYACRYLONITRILE GRAFT COPOLYMERS

RELATED APPLICATIONS

This application is a national-stage application under 35 U.S.C. §371 of International Patent Application No. PCT/US2007/008797, filed Apr. 10, 2007, entitled "Fouling Resistant Membranes Formed with Polyacrylonitrile Graft Copolymers," by Mayes, et al., which claims priority to U.S. Patent Application Ser. No. 60/791,003, filed Apr. 11, 2006, entitled "Fouling Resistant Membranes Formed with Polyacrylonitrile Graft Copolymers," by Mayes, et al., each of which is incorporated herein by reference.

GOVERNMENT FUNDING

Research leading to various aspects of the present invention were sponsored, at least in part, by the U.S. Navy, grant number N00014-02-1-0343, and the National Science Foundation, grant number CTS0120978. The U.S. Government has certain rights in this invention.

FIELD OF THE INVENTION

This invention is generally directed to polyacrylonitrile- (PAN-) based amphiphilic graft copolymers, which can be used in the production of membranes for liquid filtration. In one aspect, this invention is directed to the preparation of nanofiltration (NF) membranes whose selective layer comprises microphase-separated PAN-based, amphiphilic graft copolymers, which display high flux, fouling resistance, and/or molecular fractionation (separation of two or more species from solution) capability, e.g., at the sub-nanometer length scale. In another aspect, the invention is directed to the incorporation of PAN-based amphiphilic graft copolymers as an additive in the casting of ultrafiltration (UF) and/or microfiltration (MF) membranes, which may impart the membranes with resistance to irreversible fouling.

BACKGROUND OF THE INVENTION

A membrane is a discrete, thin interface that moderates the permeation of chemical species in contact with it. Water filtration membranes allow water to penetrate through the membrane while preventing penetration of target species. Solutes such as colloids, bacteria, viruses, oils, proteins, salts, or other species can be removed using a membrane. Polymer filtration membranes can be categorized into porous and nonporous membranes, referring to the porosity of the selective layer of membranes prepared by the immersion precipitation process. In porous membranes, the transport barrier posed is based on differences between the sizes of permeate and retentate species. In nonporous membranes, such as those used for reverse osmosis, the species are separated by means of relative solubility and/or diffusivity in the membrane material. For nonporous membranes and porous membranes for nanofiltration, poor chemical affinity between the membrane material and permeate that is passed across the membrane material, e.g., water, may inhibit permeability of the permeate. Important parameters that can characterize a good membrane for liquid filtration include high flux, fouling resistance, and/or selectivity in the desired size range. An improvement in these properties can lead to improved membrane performance.

A membrane exhibiting high flux may decrease the cost of energy for pumping the solution through the membrane, which can make the process economical. Membranes that exhibit more uniform pore sizes can have higher selectivity and/or higher efficiency.

Membrane fouling is one of the more important problems in the membrane industry. It can generally be characterized by a decline in membrane flux over time caused by components in the feed solution passed across the membrane. It can occur due to the adsorption of molecules on pore walls, pore blockage, or cake formation on the membrane surface. Flux decline typically leads to higher energy requirements, and frequent cleaning is usually required to remedy this. This is only a temporary solution, and fouling typically ultimately reduces the lifetime of the membrane. As fouling often involves the adsorption of biomolecules to the membrane surface, it can also reduce the biocompatibility of the membranes in biomedical applications.

It has been observed that hydrophilic membrane surfaces foul less, especially in membranes with larger pore sizes such as those used in ultrafiltration (UF) and microfiltration (MF). Greater wettability may reduce adsorption on the membrane surface of species present in the solution. One method of making surfaces hydrophilic is using oxygen plasma treatment, which generates hydrophilic groups such as hydroxyl and carboxylic acid groups on the material's surface. This method, however, only functionalizes the top surface of the membrane, so the fouling of internal pores is not prevented.

Graft polymerization of hydrophilic groups onto membrane surfaces has been the most common method of increasing the fouling resistance of membranes. A variety of hydrophilic monomers have been grafted onto different synthetic membranes to limit fouling by natural organic matter (NOM) and proteins. A significant drawback of these surface modification methods is the use of high-energy gamma radiation or plasmas to initiate graft polymerization. These approaches may significantly increase membrane fabrication cost and are poorly controlled. Undesirable side reactions include polymerization of ungrafted chains, which are susceptible to removal from the surface during use. Such surface graft-polymerized layers can also block pores and deteriorate flux.

Another method involves incorporation of an additive that contains reactive groups during the casting of the membrane, followed by the chemisorption of a hydrophilic and preferably biocompatible polymer through these reactive groups. A similar method involves the activation of a fraction of the groups on the surface of a cast polymer membrane (e.g. the nitrile groups in polyacrylonitrile) by a reagent, followed by coupling of a hydrophilic polymer, resulting in surface grafts. After casting the membrane, some of the nitrile groups may be converted to intermediate reactive sites followed by the coupling of poly(ethylene glycol) chains to form grafts on the surface. These methods all include several extra processing steps for the activation of reactive sites and coupling, and therefore can be relatively expensive.

Another method of producing hydrophilic surfaces is the surface segregation of polymeric additives during membrane casting by immersion precipitation. Such a method does not require any significant additional processing steps in membrane fabrication, limiting cost and providing easy integration with existing membrane casting processes. Such methods have been proposed using relatively hydrophilic homopolymers or using block copolymers with a hydrophilic and a hydrophobic block.

Others have previously used two graft copolymer additives comprising poly(oxyethylene) methacrylate, POEM, namely poly(vinylidene fluoride)-g-POEM and poly(methyl methacrylate-ran-POEM), previously to produce ultrafiltration membranes that resist protein fouling. Nevertheless, the ultrafiltration membranes produced still did not resist fouling completely and some irreversible flux loss was observed in studies using protein-containing feed solutions.

SUMMARY OF THE INVENTION

This invention is generally directed to polyacrylonitrile-(PAN-) based amphiphilic graft copolymers, which can be used, for example, in the production of membranes for liquid filtration. The subject matter of the present invention involves, in some cases, interrelated products, alternative solutions to a particular problem, and/or a plurality of different uses of one or more systems and/or articles.

In one aspect, the present invention provides systems and methods for preparing high flux, fouling resistant nanofiltration membranes whose pore size can be readily tuned for a desired application. The invention, in this aspect, makes use of the microphase separation of a graft copolymer comprising a backbone comprising polyacrylonitrile (PAN) and hydrophilic side chains. The amount of backbone and side chains in the graft copolymer may be chosen arbitrarily, so long as the backbone and side chain components are able to microphase separate, e.g., to form a bicontinuous network architecture. Any suitable ratio of backbone and side chain may be used, for example, at least about 10 wt % hydrophilic side chains; at least about 20 wt %, at least about 30 wt %, or at least about 40 wt %. The hydrophilic side chain materials can be identified, for example, by preparing a sample of the material and measuring its contact angle with water (typically, the material will have a receding contact angle of zero degrees, while a hydrophobic material will have a contact angle of greater than 60°).

Microphase separation, i.e., into a first phase and an incompatible second phase on a length scale of about 10 nm or less, e.g., about 3 nm or less, or about 2 nm or less, can be induced by repulsion between the backbone and the side chains (e.g., due to differences in hydrophilicity), and/or by preferential interactions of the side chains with the coagulant bath (the coagulant bath is used to precipitate the membrane). The backbone and side chains may separately aggregate to form hydrophobic and hydrophilic domains, which are microphase separated in certain embodiments of the invention; for example, the domains may become interspersed. In some embodiments, hydrophilic domains are provided by the side chains, i.e. the resulting plurality of hydrophilic side chains can aggregate to form hydrophilic domains interspersed with hydrophobic domains comprising the backbone. Domain sizes may be dictated by side chain dimensions and spacing along the backbone and can be determined by one of ordinary skill in the art, provided these values are known. In one embodiment, the hydrophilic domains have a mean diameter of less than about 3 nm, or less than about 2 nm. The domain size/periodicity can be measured, for example, by transmission electron microscopy/small-angle x-ray or neutron scattering.

In some cases, microphase separation can be determined through glass transition measurements, or the like, as discussed below. Upon self-assembly, the hydrophilic side chains can form nanochannels of tunable width, for instance, between about 1-10 nm, which can give the membrane its permselective properties and/or anti-fouling character. In some cases, the polyacrylonitrile backbone may be copolymerized with poly(methyl methacrylate), polyacrylic acid, polymethacrylic acid, hydrolyzed poly(t-butyl methacrylate), hydrolyzed poly(t-butyl acrylate), poly(sulfopropyl acrylate), and copolymers thereof In another aspect, the invention provides a technique for the preparation of fouling resistant microfiltration and ultrafiltration membranes, in contrast to prior art membranes which foul. Fouling can result by the deposition of biomolecules such as proteins, cells or other larger biological species such as microorganisms. In one embodiment, the article is resistant to cell and protein adsorption such that the article adsorbs less than about 90% of protein adsorbed by a corresponding parent polymer making up the backbone; and preferably less than about 50%, about 20%, about 10%, or about 5% of the protein adsorbed by the corresponding parent polymer. Typically, the corresponding parent polymer making up the backbone is hydrophobic and allows deposition of proteins or other biomolecules. The extent a membrane is resistant to biomolecular fouling can be determined by filtration studies. An example of a filtration test for determining fouling (using bovine serum albumin as a model protein) is discussed below. This technique, in some cases, makes use of a graft copolymer as an additive, for instance, in the immersion precipitation casting of ultrafiltration membranes. The additive may segregate to the membrane exterior and/or pore surfaces, e.g., due to favorable interactions between the hydrophilic side chains and the coagulant bath, which may create a surface that exhibits low fouling by biological molecules or the like in the feed solution.

In yet another aspect, the invention is directed to a membrane for liquid filtration. In one set of embodiments, the membrane includes an amphiphilic graft copolymer comprising a polyacrylonitrile backbone and a plurality of oligomeric hydrophilic side chains.

In still another aspect, the invention is directed to a method for water filtration. The method, according to one set of embodiments, includes acts of providing a membrane comprising an amphiphilic graft copolymer comprising a polyacrylonitrile backbone and a plurality of oligomeric hydrophilic side chains, and allowing water to pass through the membrane.

The invention, according to yet another aspect, is directed to a method for molecular fractionation. In one set of embodiments, the method includes acts of providing a membrane comprising a selective layer comprising a microphase-separated graft copolymer comprising a polyacrylonitrile backbone and a plurality of oligomeric hydrophilic side chains, and filtering molecular solutions through the membrane selective layer to selectively pass molecules on the basis of size.

In one aspect, the invention is directed to a membrane for liquid filtration. In one embodiment, the membrane includes an amphiphilic graft copolymer comprising a polyacrylonitrile backbone and a plurality of hydrophilic side chains, where the graft-copolymer is microphase-separated. In some cases, the hydrophilic side chains aggregate to form nanometer-scale domains interspersed with polyacrylonitrile-rich domains of the backbone.

The membrane, in another set of embodiments, includes an amphiphilic graft copolymer comprising a polyacrylonitrile backbone and a plurality of hydrophilic side chains. In some cases, the hydrophilic side chains comprise at least about 30 wt % of the graft copolymer and/or aggregate to form nanometer-scale domains having an effective size of less than about 3 nm. The effective size of the nanochannels can be readily determined by those of ordinary skill in the art, for example, by filtration of molecular dyes of known dimensions. In one embodiment, the nanometer-scale domains are interspersed with polyacrylonitrile-rich domains of the backbone. In some instances, the graft copolymer is microphase-separated.

In another aspect, the invention is directed to a method for water filtration. The method, in one set of embodiments, includes acts of providing a membrane comprising an amphiphilic graft copolymer comprising a polyacrylonitrile backbone and a plurality of hydrophilic side chains, where the graft copolymer is microphase separated, and passing water through the membrane.

The invention, in yet another aspect, is a method for molecular fractionation. In one set of embodiments, the method includes acts of providing a membrane comprising a selective layer comprising a microphase-separated graft copolymer comprising a polyacrylonitrile backbone and a plurality of hydrophilic side chains, and filtering molecular solutions through the membrane selective layer to selectively pass molecules on the basis of size.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

DESCRIPTION OF DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures:

FIG. 12A is the surface; FIGS. 12B-12D are cross-sections.

DETAILED DESCRIPTION OF THE INVENTION

Figure 1:
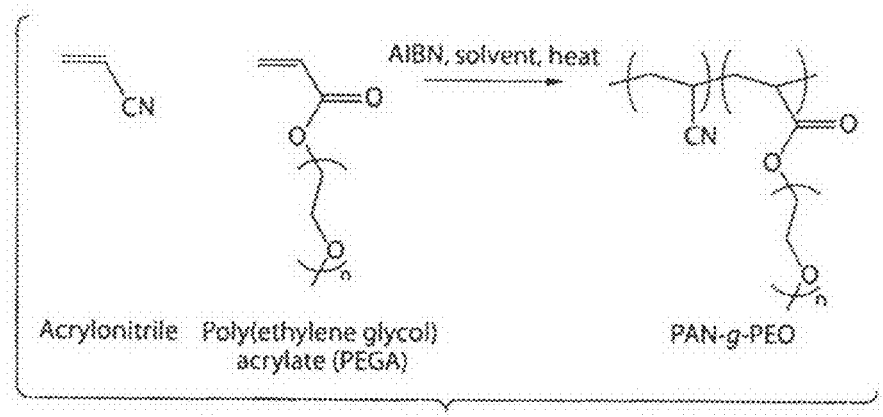
FIG. 1. Representative synthesis scheme for polyacrylonitrile-graft-poly(ethylene oxide), PAN-g-PEO, according to one embodiment of the invention.

The present invention is generally directed towards the use of graft copolymers comprising backbones comprising polyacrylonitrile and hydrophilic side chains. The copolymers can be used, for example, in the manufacture of membranes for microfiltration (MF), ultrafiltration (UF), and/or nanofiltration (NF) applications. Microfiltration applications typically involve the separation of particles or species having dimensions smaller than micrometers from larger ones, and the separation is controlled by the size of the pores in the membrane, typically 0.1 to 10 micrometers for a microfiltration membrane. Similarly, the pore sizes in nanofiltration are on the order nanometers, e.g., 1-10 nm, while the pore sizes in ultrafiltration are of intermediate size, e.g., 0.1 micrometers to several nanometers.

The membranes of the present invention may show fouling resistance compared to unmodified membranes. In some embodiments, NF membranes prepared using such graft copolymers also display substantially higher bulk flux than current commercial NF membranes, and/or water-permeable channels that are tunable and selective in the subnanometer range.

One aspect of the invention is based on the self-organization properties of the backbone and side chains of a graft copolymer. In some cases, the graft copolymer is amphiphilic, i.e., possessing both hydrophilic and hydrophobic regions. The backbone, in one set of embodiments, comprises polyacrylonitrile (PAN). The side chains comprise a polymer more hydrophilic than the backbone, e.g., more hydrophilic than PAN (where the hydrophilicity of a substance can be determined based on its receding water contact angle, as previously discussed; a more hydrophobic material will have a greater receding contact angle than a more hydrophilic material). The side chains may have any suitable molecular weight (number average), for example, at least about 150 g/mol, at least about 250 g/mol, at least about 350 g/mol, at least about 500 g/mol, etc. In one embodiment, the side chains comprise poly(ethylene oxide) (PEO), having any suitable number of repeat units. Other non-limiting examples of side chains potentially useful in various embodiments of the invention include poly(ethylene glycol), poly(hydroxyethyl methacrylate), poly(hydroxyethyl acrylate), hydrolyzed poly(t-butyl methacrylate), hydrolyzed poly(t-butyl acrylate), polyacrylamide, poly(N-vinyl pyrrolidone), poly(aminostyrene), poly(methyl sulfonyl ethyl methacrylate), and copolymers thereof.

A "graft copolymer," as used herein, involves the provision of a parent polymer comprising the backbone and a second polymer comprising a plurality of side chains. Graft copolymers derived from a parent polymer allow generation of a material with specific properties while retaining desirable properties of the parent polymer. Graft copolymers can be synthesized through a variety of methods. Examples of a grafting reactions are discussed in U.S. patent application Ser. No. 09/951,125, filed Sep. 12, 2001, entitled "Graft Copolymers, Methods for Grafting Hydrophilic Chains onto Hydrophobic Polymers, and Articles Thereof," by Mayes, et al., published as U.S. Patent Application Publication No. 2002/0147282 on Oct. 10, 2002, incorporated herein by reference. In some embodiments, graft copolymers are synthesized by free radical copolymerization of the parent monomer, e.g., acrylonitrile, with a macromonomer, e.g., polyethylene oxide acrylate, polyoxyethylene acrylate, polyethylene glycol acrylate, and the like Without wishing to be bound by any theory, it is believed that, due to backbone-side chain incompatibility and/or interactions of the side chains with the coagulant bath, microphase separation of the backbone and side chains occurs. Such microphase separation may be due, at least in part, to differences in hydrophilicity between the backbone component and the side chains. The size scale of the resulting domains can be tuned using such parameters as the chemistry and relative volume ratios of the backbone and side chains, the degree of polymerization of the side-chains, the distribution of side chains along the backbone, and/or the membrane casting conditions. In general, such tuning, to achieve a desired property of the resulting polymer as is desired for a given application, can be accomplished by those of ordinary skill in the art with no more than routine experimentation and optimization.

Figure 2:
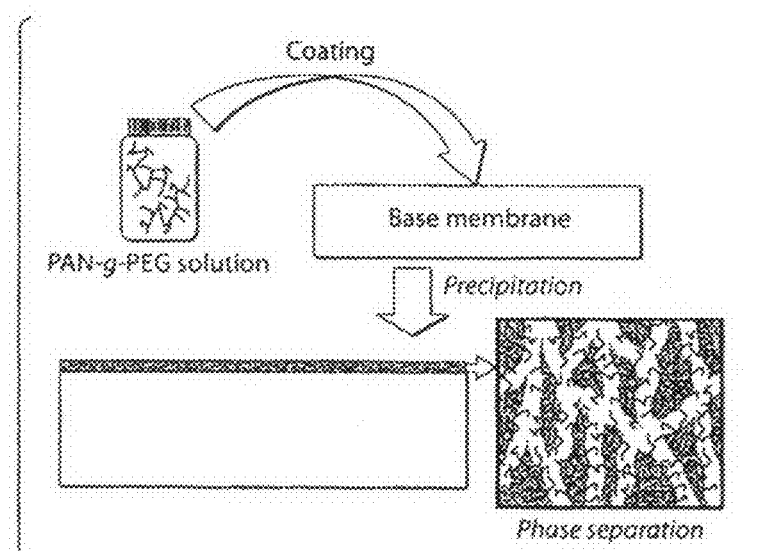
FIG. 2. Schematic representation of the microphase separation of an amphiphilic PAN-based graft copolymer to form water permeable nanochannels in the selective layer of nanofiltration membranes, in another embodiment of the invention.

In some embodiments of the invention, the copolymers described above may be used in a membrane. For instance, in a microphase-separated layer, the graft copolymer sidechains, according to certain aspects of the invention, form a network of nanometer-scale hydrophilic domains that can act as water-permeable channels. In some cases, the channels form a continuous network, e.g., connecting one side of the layer to the other. The size of these Channels may determine the separation characteristics of the resultant nanofiltration membrane, along with the conformations of the hydrophilic side-chains that define the channels. A schematic, non-limiting illustration of microphase separation of the graft copolymer and the hydrophilic nanochannels that result from this process is given in FIG. 2. The size scale of the hydrophilic domains is suitably small (1-10 nm range) in this example, which may enable molecular-scale fractionation using the membrane, e.g., of proteins in solution, or the like.

In one embodiment of the present invention, a membrane useful for nanofiltration comprises hydrophilic domains having a dimension less than about 10 nm, less than about 3 nm, less than about 2 nm, etc. A feature of this embodiment of the invention is that the hydrophilic domains provide chemical affinity for water, which facilitates the transport of water in preference to the retentate, while the PAN-rich domains provide mechanical, chemical, and/or thermal stability. Crosslinking of the PAN domains can be accomplished, for instance, through heat treatment of the finished membrane, to provide to additional stability.

Size selectivity of molecular transport can be effectively controlled through the NF membrane nanochannel morphology and/or the dimension of the hydrophilic domain. The hydrophilic domain size for a given filtration application (e.g., from 1-10 nm) can be achieved, for example, by varying the side chain length and/or spacing along the graft copolymer backbone, casting solvent, and/or coagulation bath parameters such as temperature and/or composition. The effective pore size of the NF membranes can be assessed, for example, through the filtration of molecular probe dyes or other molecules such as dendrimers or globular proteins of known dimension.

It should be noted that the above discussion of nanofiltration membranes should be read as being exemplary and not limiting. Nanofiltration membranes are used in this manner for convenience. However, in other embodiments, of the invention, the membrane may have other pore sizes (e.g., if the membrane were a microfiltration membrane or an ultrafiltration membrane), and the above description with respect to nanochannel materials also applies.

One embodiment of the invention provides for a NF membrane in which the selective layer of the membrane is electrically neutral. The "selective layer" of a membrane is that portion of the membrane which typically allows separation to occur. As the selective layer can be weak in some cases, a substrate layer or a base membrane may be provided to the selective layer (typically, such that they are in direct contact) for mechanical strength. Non-limiting examples of base membranes include polyacrylonitrile, poly(vinylidene fluoride), polysulfone, poly(ether sulfone), poly(aryl sulfone), poly(methyl methacrylate), polypropylene, and copolymers thereof.

Commercial nanofiltration membranes typically have charged selective layers and therefore the separation obtained with such membranes is influenced by the charge of the solvated species. In some embodiments of the present invention, the separation occurs based on molecular size, which may allow the fractionation of like-charged molecular species.

Thus, in one embodiment of the invention, a polymer such as a PAN graft copolymer is used as a selective layer of a membrane; for example, a nanofiltration (NF) membrane. NF membranes, as discussed herein, are membranes having effective pore sizes smaller than about ten nanometers. In one embodiment of the invention, the nanofiltration membranes are prepared by coating a microfiltration or ultrafiltration membrane with a layer of graft copolymer solution, followed by precipitation. The precipitation may be induced, for example, by immersing the coated membrane in a solution that is not compatible with the graft copolymer, and particularly is not compatible with the PAN component of the graft copolymer. The base membrane may be, for instance, any MF or UF membrane to which the PAN graft copolymer will readily adhere, and may include polyacrylonitrile, poly(vinylidene fluoride) and other suitable fluoropolymers, polysulfone, poly(ether sulfone), poly(aryl sulfone), and the like, poly(methyl methacrylate), and/or polyolefin derivatives, as well as copolymers thereof.

Another aspect of the present invention provides NF membranes with good water wettability and resistance to fouling by biomolecules in the feed solution such as proteins, carbohydrates, or NOM (natural organic matter). Without wishing to be bound by any theory, it is believed that such wettability and fouling resistance are afforded through the localization of hydrophilic side chains of the amphiphilic PAN graft copolymer at the surface of the selective layer of the NF membrane. It is a novel aspect of some embodiments of the present invention that irreversible fouling by biological molecules can be substantially eliminated using the graft copolymer of the invention as an additive in the formation of porous MF or UF membranes, etc.

The flux through the membrane may be determined, for instance, by measuring the flow of pure water through the nanofiltration membranes of the invention. The flux may be due to the large volume constituting the hydrophilic domains in the selective copolymer layer, resulting in a large effective pore area on the membrane surface. The high hydrophilicity of the PEO domains also may contribute to high flux. As an example, in one embodiment of the invention, a NF membrane may show a pure water flux that is at least about 25 $L/m^2.hr.MPa$, at least about 50 $L/m^2.hr.MPa$, at least about 100 $L/m^2.hr.MPa$, etc.

Figure 3:
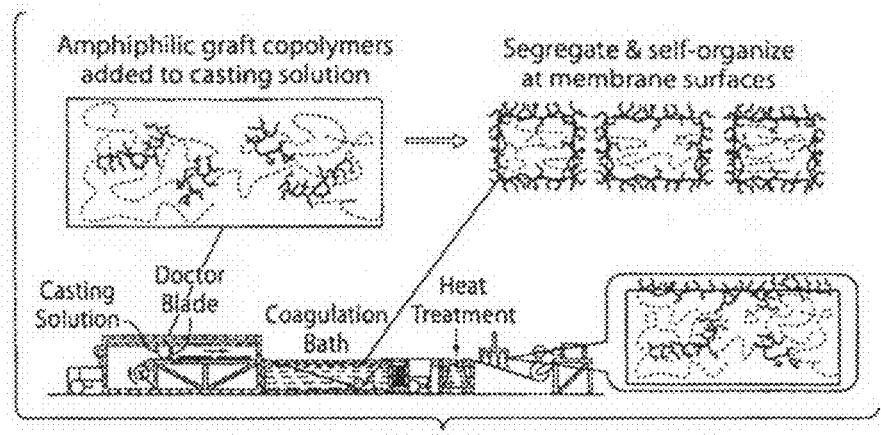
FIG. 3. Schematic representation of the surface segregation of an amphiphilic PAN-based graft copolymer additive during immersion precipitation casting of UF or MF membranes, according to yet another embodiment of the invention.

For example, in one embodiment of the invention, the amphiphilic graft copolymer comprising backbones comprising PAN and hydrophilic side chains is employed as a polymeric additive in ultrafiltration or microfiltration membranes. The copolymer may allow fouling resistance, for example, resistance to irreversible fouling by biological molecules in the feed solution. Thus, for example, a membrane of the invention may show an irreversible pure water flux loss after 24 h dead-end filtration of 1000 Mg/L bovine serum albumin solution that is less than about 2%. In one embodiment, the graft copolymer is blended in a relatively small fraction with the matrix polymer in solution for immersion precipitation casting of an ultrafiltration (UF) or microfiltration (MF) membrane, or the like. A schematic of the process is given in FIG. 3. The immersion precipitation method has been described extensively and involves preparation of a polymer solution which is cast in a film a few hundred microns in thickness and immersed in water or a water-rich coagulant bath. The polymer precipitates to form an asymmetric membrane structure. When the graft copolymer of the invention is added in the solution of the second, matrix polymer, and the blend is precipitated, the graft copolymer segregates to the water interface due to enthalpic and/or entropic driving forces. An example of such a system is where the membrane has a surface and a bulk, and the membrane includes an entangled blend of a first polymer component and a second polymer component. The second polymer component may define a graft copolymer comprising the polyacrylonitrile backbone and the plurality of oligomeric hydrophilic side chains, where the graft copolymer may reside at the surface of the membrane in a ratio of the second polymer component to the first polymer component that is greater than the ratio of the second polymer component to the first polymer component in the bulk of the membrane.

In some embodiments, the surface of the membrane as well as the surfaces inside its pores are covered by the hydrophilic side chains of the graft copolymer, which may reduce the adsorption of foulants. The surface coverage of the graft copolymer additive can be enhanced, for instance, by annealing the membranes in water to allow the migration of more copolymer to the surface.

Another aspect of the invention is generally directed to preparing or synthesizing any of the polymers described herein. Synthesis of the graft copolymer can be accomplished by a variety of methods known to those of ordinary skill in the art. In one embodiment, the graft copolymer is synthesized by free radical copolymerization of acrylonitrile monomer with a macromonomer of the hydrophilic component. A macromonomer is defined herein as an oligomer of repeat units (which may be hydrophilic, or at least more hydrophilic than the backbone) with a polymerizable functional group at one end of the chain. In some embodiments, the hydrophilic repeat unit is ethylene oxide and the functional group is an acrylate group, as illustrated in FIG. 1. In FIG. 1, n may be any suitable number of ethylene glycol repeat units, for example, 3, 4, 5, 6, 7, 8, 9, 10, or more in some cases. Other specific non-limiting examples of hydrophilic side chains include poly(hydroxyethyl methacrylate), poly(hydroxyethylacrylate), hydrolyzed poly(t-butyl methacrylate), hydrolyzed poly(t-butyl acrylate), polyacrylamide, poly(N-vinyl pyrrolidone), poly(vinyl alcohol), poly(aminostyrene), poly(methyl sulfonyl ethyl methacrylate), and the like, and copolymers comprising any of the above, and the like. In certain embodiments of the invention, the side chains and/or backbone may incorporate monomers with charged side groups such as sulfonate, carboxylic acid, and/or amine groups, for instance, to provide salt rejection, pH tunable rejection capability, etc.

An important feature of certain embodiments of this invention, such as described above, is the ease of manufacture of the described membranes. The coating process is widely used by those of ordinary skill in the art and known in the industry. Therefore, the production of the described membranes has the potential for easy adaptation and low manufacturing cost, according to certain embodiments of the invention.

In another set of embodiments, the membrane is cast by immersion precipitation. Immersion precipitation commonly results in membranes comprising an asymmetric structure with a relatively dense, 0.1 to 1 micrometer surface layer overlaying a sublayer. The sublayer may be highly porous in some cases. This asymmetric structure is advantageous in certain embodiments of the invention, since separation of species in the feed solution during filtration can be achieved at the membrane surface, while relatively high fluxes are allowed through the large pore channels that comprise the bulk of the membrane volume. In one embodiment, the NF membrane comprises or consists essentially of the microphase-separated graft copolymer, including hydrophilic domains. In another embodiment, however, the membrane can comprise a blend of the amphiphilic graft copolymer and at least one other polymer. The other polymer may be a more hydrophobic polymer, such as those generally used in the formation of membranes, examples of which include, but are not limited to, polyacrylonitrile, poly(vinylidene fluoride) and other suitable fluoropolymers, polysulfone, poly(ether sulfone), poly(aryl sulfone), and the like, poly(methyl methacrylate) and polyolefin derivatives. The blend can comprise any percentage of the graft copolymer. In some cases, the fabricated membrane has the microphase-separated graft copolymer as the majority component in the dense surface layer of the membrane. In certain embodiments, the mechanical properties of the resulting membrane are suitable to withstand the operational pressures of liquid filtration processes. It is a feature of some embodiments of the invention that the graft copolymer may be a majority component in the dense surface layer of the membrane even when it is a minority component in the porous membrane sublayer, due to the capability of the amphiphilic copolymer to localize preferentially at the surface during membrane fabrication by immersion precipitation.

The following documents are incorporated herein by reference: U.S. Provisional Patent Application Ser. No. 60/791,003, filed Apr. 11, 2006, entitled "Fouling Resistant Membranes Formed with Polyacrylonitrile Graft Copolymers," by Mayes, et al.; and U.S. patent application Ser. No. 09/258,526, filed Feb. 26, 1999, entitled "Polymer Articles, including Membranes, having Hydrophilic Surfaces and Method for their Preparation," by Mayes, et al., now U.S. Pat. No. 6,413,621, issued Jul. 2, 2002.

The function and advantage of these and other embodiments of the present invention will be more fully understood from the examples below. The following examples are intended to illustrate the benefits of the present invention, but do not exemplify the full scope of the invention.

Example 1

Synthesis of Polyacrylonitrile-graft-poly(ethylene glycol) (PAN-g-PEO) using Toluene as a Solvent In this example, a graft copolymer with a PAN backbone and PEO side-chains, used in the preparation of certain membranes of the invention, was synthesized as follows. Acrylonitrile (Aldrich) and poly(ethylene glycol) methyl ether acrylate (PEGA) (454 g/mol, Aldrich) were passed through a column of basic activated alumina (VWR) to remove the inhibitor. Acrylonitrile (10 g, 188 mmol), PEGA (10 g, 22 mmol) and azobisisobutyronitrile (AIBN, 0.01 g, Aldrich) were dissolved in toluene (50 ml) in a round bottom flask. The flask was sealed. Nitrogen was bubbled through the reaction mixture with stirring for 20 minutes. The flask was then kept at 90° C. with stirring for 24 hours. The reaction mixture, which was observed to contain precipitated polymer, was then precipitated in hexane, and purified by stirring two fresh portions of hexane for several hours, followed by drying in the vacuum oven overnight. The composition of the white polymer obtained was calculated from the $^1$H-NMR spectrum, using the ratio of the total backbone protons (1.5-2.5 ppm) to the COOCH$_2$ protons of PEGA (44.5 ppm).

The polymer was determined to contain 53 wt % PEGA, equivalent to 45 wt % PEO. The number-average molecular weight was measured to be 93 kg/mol based on polystyrene standards.

Example 2

Synthesis of Polyacrylonitrile-graft-poly(ethylene glycol) (PAN-g-PEO) using Dimethyl Formamide as a Solvent In this example, acrylonitrile (Aldrich) and poly(ethylene glycol) methyl ether acrylate (PEGA) (454 g/mol, Aldrich) were passed through a column of basic activated alumina (VWR) to remove the inhibitor. Acrylonitrile (10 g, 188 mmol), PEGA (10 g, 22 mmol) and azobisisobutyronitrile (AIBN, 0.01 g, Aldrich) were dissolved in dimethyl formamide (DMF, 50 ml) in a round bottom flask. The flask was sealed. Nitrogen was bubbled through the reaction mixture with stirring for 20 minutes. The flask was then kept at 60° C. with stirring for 24 hours. The reaction mixture was then precipitated in a 1:1 mixture of hexane and ethanol, and purified by redissolving the polymer in DMF and reprecipitation in 1:1 hexane-ethanol mixture, followed by drying in the vacuum oven overnight. The composition of the white polymer obtained was calculated from the $^1$H-NMR spectrum, using the ratio of the total backbone protons (1.5-2.5 ppm) to the COOCH$_2$ protons of PEGA (4-4.5 ppm). The polymer was determined to contain 60 wt % PEGA, equivalent to 53 wt % PEO. The number-averaged molecular weight of the polymer was measured by gel permeation chromatography (GPC) using DMF as solvent. The number-average molecular weight was measured to be 135 kg/mol based on polystyrene standards.

Example 3

Microphase Separation Characteristics of PAN-g-PEO Samples with Different Casting Conditions To observe the microphase separation characteristics of PAN-g-PEO, three different sets of samples were prepared for differential scanning calorimetry (DSC) testing in this example. DSC was done using a TA Instruments Q100 in modulated DSC (MDSC) mode so the kinetic effects could be removed from the obtained data and glass transitions could be observed more clearly through isolation of the reversible heat flow.

The first set of samples was aimed at simulating the conditions for membranes cast in isopropanol. For that, a glass microscope slide was covered with a thin layer of 20 wt % solution of PAN-g-PEO in DMF, so that approximately 0.3 ml of solution was spread over an area of 1.5 cm by 3 cm. The slide was then immersed in isopropanol for 30 minutes, followed by immersion in water for 10 minutes. The recovered transparent film detached from the glass and was dried in a vacuum oven.

Figure 4:
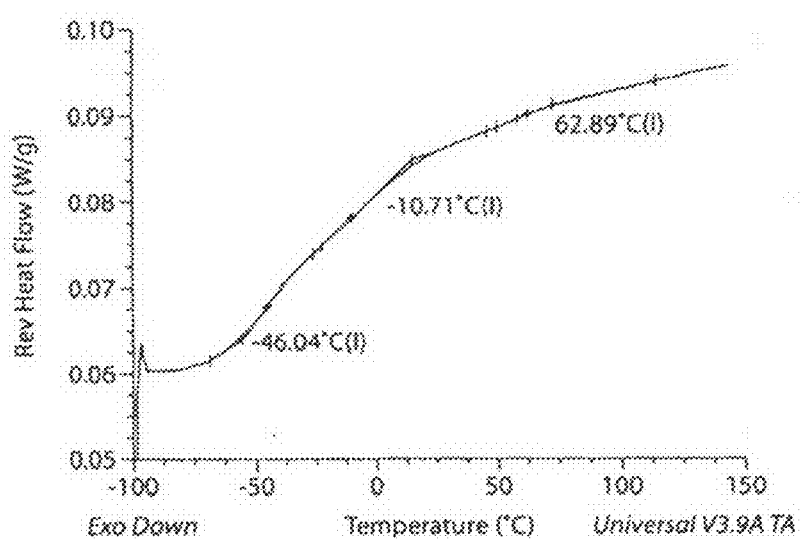
FIG. 4. Modulated differential scanning calorimetry (MDSC) trace of a PAN-g-PEO sample described in Example 2, precipitated in isopropanol.

The MDSC plot for such a sample prepared from the polymer described in Example 2 is shown in FIG. 4. Three glass transitions ($T_g$) were observed: The first one, at approximately −46° C., was believed to correspond to the PEO-rich domains, the second at −11° C. to a mixed interphase region, and the third at 63° C. to the PAN-rich domains. The presence of 3 $T_g$'s suggested that the polymer was microphase separated when precipitated in isopropanol.

The second set of samples was obtained by evaporation of a common solvent. Samples were prepared by placing a few droplets of 20 wt % PAN-g-PEO solution in N,N-dimethylformamide (DMF) into a DSC pan and evaporating the solvent at 75° C.

Figure 5:
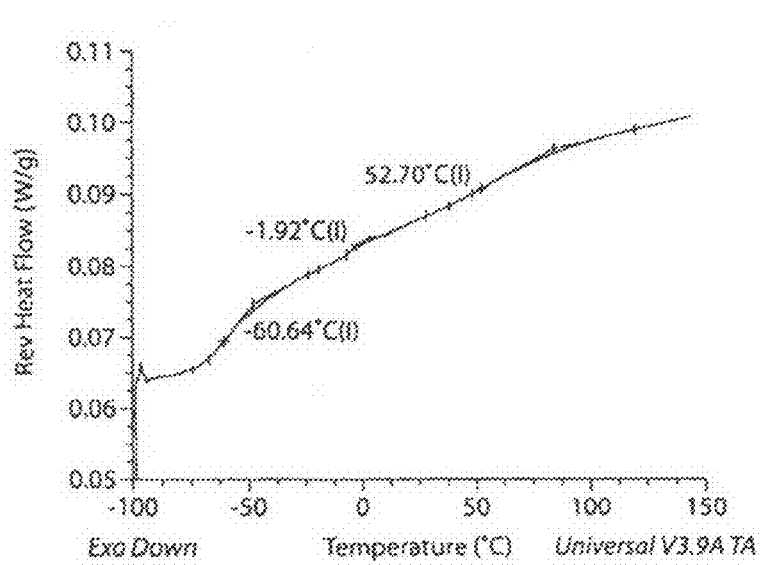
FIG. 5. Modulated differential scanning calorimetry (MDSC) trace of a PAN-g-PEO sample described in Example 1, dried in air.

The MDSC plot for such a sample prepared from the copolymer described in Example 1 is given in FIG. 5. Three glass transition temperatures ($T_g$'s) were located: The first one, at approximately −61° C., was believed to have arisen from the PEO-rich domains, the second at −2° C. from the interphase regions, and the third at 53° C. from the PAN-rich domains. The presence of 3 $T_g$'s suggested that the polymer was microphase separated, similar to the films precipitated in isopropanol.

Example 4

Preparation of Thin Film Composite Nanofiltration Membranes from PAN-g-PEO

In this example, a nanofiltration membrane was prepared using the graft copolymer described in Example 1. The polymer (2 g) was dissolved in N,N-dimethylformamide (DMF, VWR, 8 ml) at approximately 50° C. The polymer solution was passed through a 1 micrometer syringe filter (Whatman) and degassed in a vacuum oven for at least 2 hours. A PAN400 ultrafiltration membrane, purchased from Sepro Inc. (Oceanside, Calif.), was used as the base membrane. The membranes were coated using a control coater (Testing Machines Inc., Ronkonkoma, N.Y.). The PAN400 base membrane was fixed onto the coater, and the coating bar (number 4, nominal film thickness 40 micrometers) inserted. The coating solution was poured onto the base membrane to form a thin line about 0.5 cm from the coating bar, and the coater was used to move the bar at a constant reproducible speed (speed level 4 on the instrument). After waiting for 5 minutes, the membrane was immersed in a bath of isopropanol for 30 minutes, followed by immersion in a water bath.

Figure 6A:
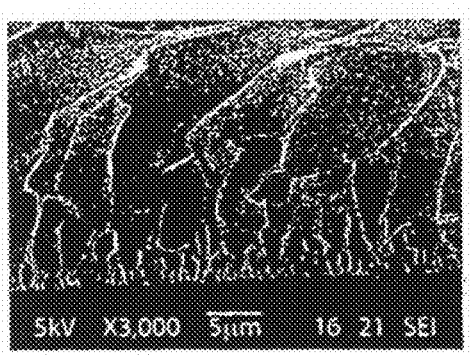
FIGS. 6A-6B. Scanning electron microscope (SEM) images of uncoated (6A) and coated (6B) membranes, produced in accordance with one embodiment of the invention.
Figure 6B:
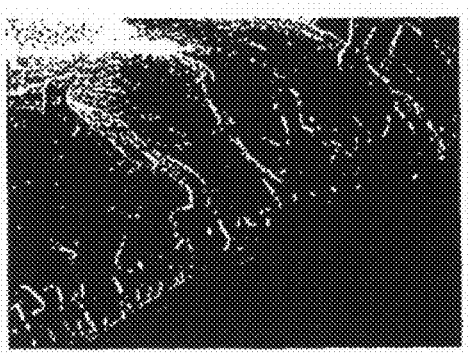

In FIGS. 6A-6B, scanning electron microscopy (SEM) images of the uncoated base membrane (left) and coated membrane (right) are given at the same magnification. The coating layer can be observed. The coating thickness was about 2 micrometers.

Example 5

Contact Angle of PAN and PAN-g-PEO Surfaces

Figures 7A, 7B:
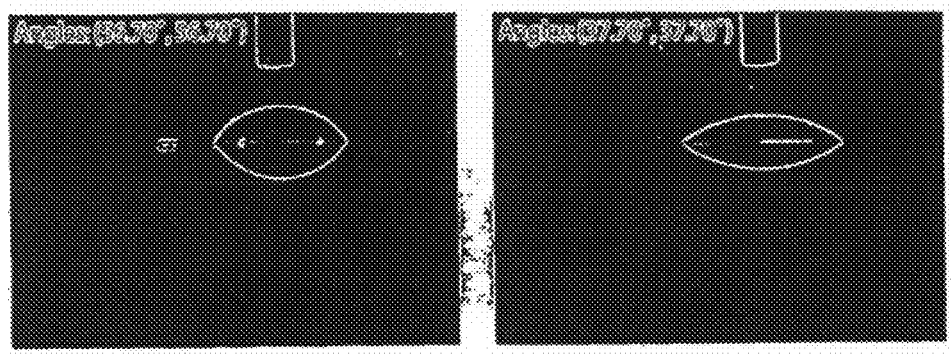
FIGS. 7A-7B. Contact angle measurements of PAN (7A) and PAN-g-PEO (7B) films, according to another embodiment of the invention.

As an indicator of the hydrophilicity of the materials, thin films of commercial PAN (Aldrich) and PAN-g-PEO from Example 1 were prepared in this example on silicon by spin coating. Sessile drop contact angle measurements were performed on these samples. Images from these experiments are shown in FIGS. 7A-7B. It was observed that the contact angle of the PAN surface (left) was around 57°, whereas that of the PAN-g-PEO (right) was around 38°. The much lower contact angle of the copolymer suggested the higher hydrophilicity of the copolymer material.

Example 6

Pure Water Flux through PAN-g-PEO Coated Nanofiltration Membranes

The pure water fluxes through the membranes described in Example 4 were measured in this example using 49-mm diameter membranes with a SEPA ST stirred, dead-end filtration cell (Osmonics) with an effective filtration area of 16.9 cm$^2$ and a liquid capacity of 300 mL. The cell was stirred at 500 rpm, and the test was performed at 0.345 MPa (50 psi). After a stabilization period of at least 1 hour, a sample of the permeate was collected over 10 minutes and weighed. The value obtained was converted to flux. A flux value of 100 L/m$^2$.hr.MPa was obtained for the PAN-g-PEO coated membrane. In similar experiments, the pure water flux of an Osmonics DS-5-DL nanofiltration membrane was determined to be 19.4 L/m$^2$.hr.MPa. This showed that the PAN-g-PEO coated membrane described in Example 5 has a pure water flux approximately 5 times that of the representative commercial NF membrane, in this particular example.

Example 7

Protein Fouling Resistance of PAN-g-PEO Coated Nanofiltration Membranes Compared with the Base Membrane Employed In this example, 25 mm diameter circular pieces were cut from a PAN-g-PEO coated NF membrane prepared as described in Example 4, and an uncoated SEPRO PAN400 base UF membrane. The membranes were wetted in water for at least one hour before performing filtration experiments. Fouling experiments were performed using an Amicon 8010 stirred, dead-end filtration cell (Millipore) with a cell volume of 10 mL and an effective filtration area of 4.1 cm$^2$, attached to a 3.5-L dispensing vessel. First, Milli-Q deionized water was run through the membranes until the flux stabilized. Then, the feed solution was replaced with 1000 mg/L bovine serum albumin (BSA, Aldrich) in phosphate buffer saline (PBS, Aldrich). After several hours, the vessel and the filtration cell were emptied and rinsed 5-6 times with Milli-Q water, and then refilled with Milli-Q water. Throughout the experiments, the permeate was collected at fixed time intervals using a FRAC-100 fraction collector (Pharmacia) and weighed to determine transmembrane flux.

Figure 8:
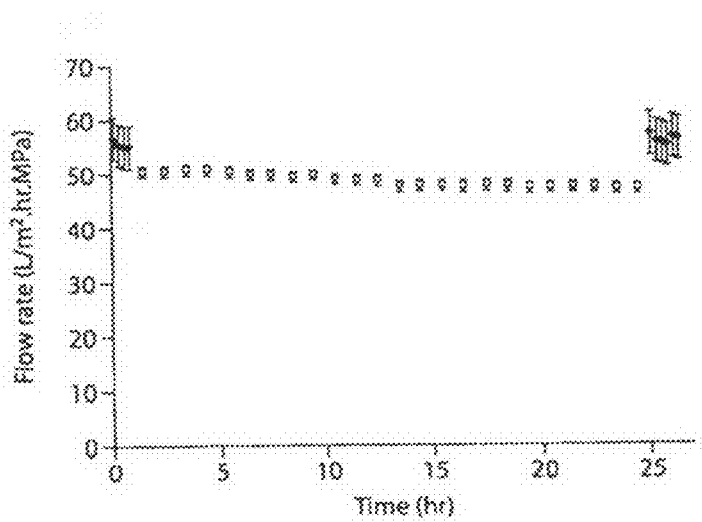
FIG. 8. Dead-end filtration (where the permeate is directed at the filter, without a mechanism for removing the retentate from the solution) of bovine serum albumin (BSA) through PAN-g-PEO coated nanofiltration membrane, in one embodiment of the invention. The feed solution was 1 g/L bovine serum albumin in phosphate buffered saline. ♦ (diamonds) are BSA; ■ (squares) are Milli-Q deionized water.

The flux vs. time through the coated membrane is shown in FIG. 8. After 24 h of exposure to BSA solution, only a slight reduction in flux was observed. Upon switching the protein feed solution back to water, the initial pure water flux was fully recovered, i.e., no irreversible fouling was observed here.

Figure 9:
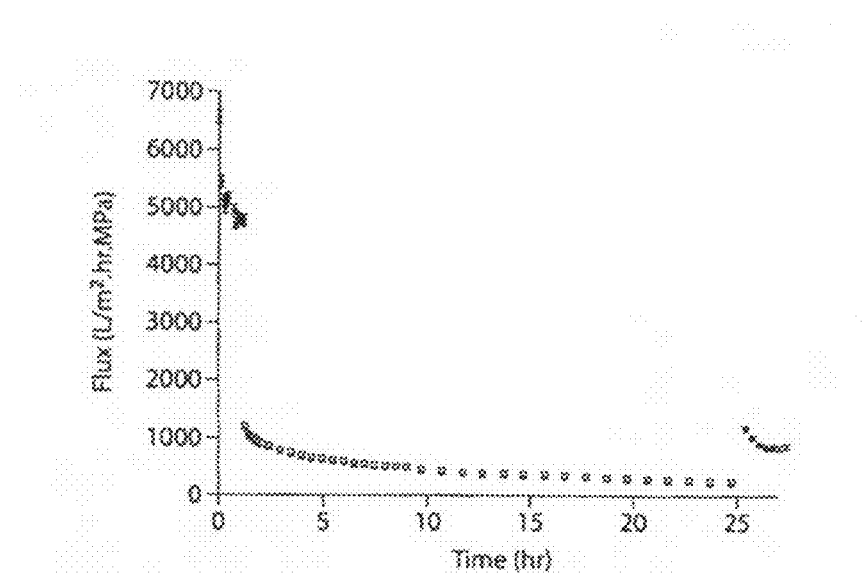
FIG. 9. Dead-end filtration of BSA through a commercially-available Sepro PAN400 base UF membrane. The feed solution was 1 g/L bovine serum albumin in phosphate buffered saline. ♦ (diamonds) are BSA; ■ (squares) are Milli-Q deionized water.

As a control, the fouling characteristics of the Sepro PAN400 base membranes were tested. The BSA retention by this membrane was measured to be 73%. The change of flux with filtration time for this membrane is shown in FIG. 9. After 24 h of BSA filtration, the flux had decreased to approximately 5% of the initial pure-water flux. Upon returning to a pure water feed, the commercial PAN membrane showed 82% irreversible loss of its initial pure water flux of 4770 L/m$^2$.hr.MPa to 860 L/m$^2$.hr.MPa.

Example 8

Pore Size Determination of PAN-g-PEO Coated Nanofiltration Membranes

Membranes prepared as described in Example 4 were used in the experiments in this example. The retention experiments were performed on 49-mm diameter membranes using a SEPA stirred, dead-end filtration cell (Osmonics) with an effective filtration area of 16.9 cm$^2$ and a liquid capacity of 300 mL. The cell was stirred at 500 rpm to minimize concentration polarization, and the tests were performed at 0.345 MPa (50 psi). Milli-Q water was run through the membrane for at least an hour to reach equilibrium. Then the cell was emptied, and a 100 mg/L solution of the probe dye in Milli-Q water was placed in the cell. After an equilibration period of at least an hour, a sample was collected. The cell was rinsed generously with Milli-Q water, and Milli-Q water was run through the membrane until the permeate was completely clear, before switching to a new probe dye.

Figure 10:
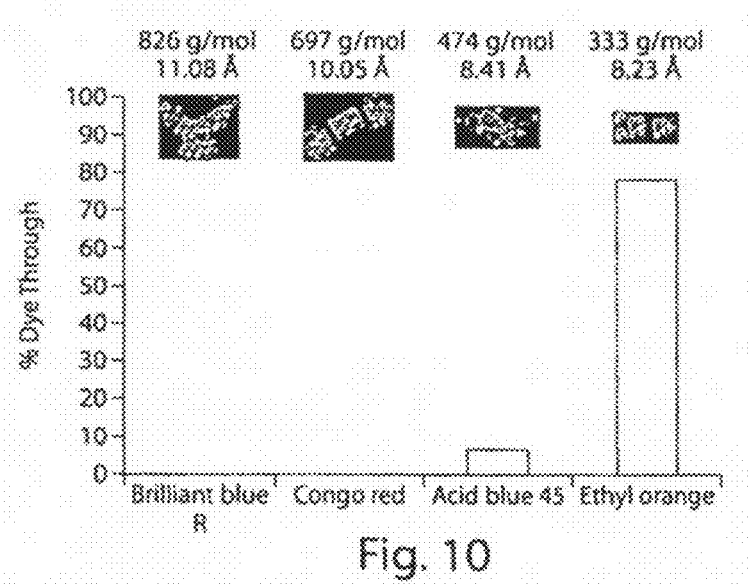
FIG. 10. Molecular dye retention by a PAN-g-PEO coated NF membrane, in yet another embodiment of the invention. Calculated molecular dye sizes are shown. All dyes exhibited a negative charge.

The effective pore sizes of the described membranes were estimated to be in the range of 1-3 nm, based on the molecular architecture of the graft copolymer. FIG. 10 shows the retention of different negatively charged dyes by the two membranes. The dye diameter was calculated using the molecular volume values obtained by Molecular Modeling Pro software by ChemSW. It can be seen that the size cut-off of the membrane was between 1.0 nm and 0.84 nm. Thus, such membranes may be used for sub-nanometer scale separations.

Example 9

Figure 11:
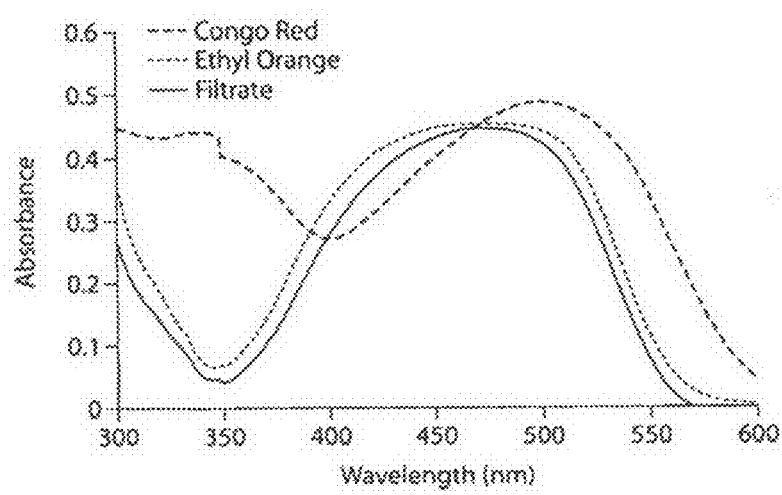
FIG. 11. Demonstration of the fractionation ability of a PAN-g-PEO coated nanofiltration membrane, in accordance with one embodiment of the invention. Fractionation of congo red and ethyl orange molecular dyes is shown.
Figure 12A:
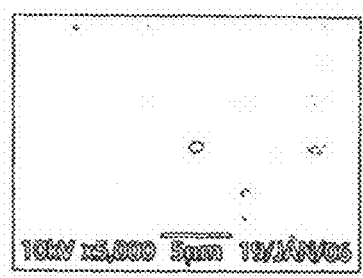
FIGS. 12A-12D. Scanning electron microscope (SEM) image of a cast PAN-g-PEO/PAN blend ultrafiltration membrane, produced in one embodiment of the invention.
Figure 12B:
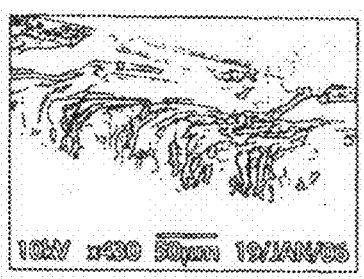
Figure 12C:
Figure 12D:

Demonstration of the Fractionation of Two Molecules by PAN-g-PEO Nanofiltration Membrane The experiment in this example was performed in a similar manner to that described in Example 8, using a NF membrane sample as described in Example 4. However, instead of a single dye solution, the feed contained 100 mg/L each of congo red and ethyl orange dyes. A sample of the permeate was collected after 2 hours of filtration. By UV-visible spectroscopy, the permeate was measured to contain 80 mg/L ethyl orange and no congo red, as determined by UV-visible spectroscopy. FIG. 11 shows the UV-visible spectra of the two single dyes and the permeate (diluted ⅕ to obtain concentrations in the range where absorbance is linear with concentration). This indicates the potential of these membranes for use in fractionation of small molecules mainly by size.

Example 10

Preparation of PAN/PAN-g-PEO Blend UF Membranes

In this example, PAN-g-PEO containing UF membranes were prepared using the immersion precipitation method, as discussed above. PAN (Aldrich, 1.2 g) was dissolved in DMF (8.8 ml) at approximately 50° C. In a separate container, the PAN-g-PEO copolymer as described in Example 2 (1.2 g) was dissolved in DMF (8.8 mL). 8 ml of the PAN solution was combined with 2 mL of the PAN-g-PEO solution. The mixture was passed through a 1 micrometer syringe filter and degassed for at least 2 hours. For the preparation of membranes, a control coater (Testing Machines Inc., Ronkonkoma, N.Y.) was used with a micrometer-adjustable doctor blade accessory. A flat glass bed was placed in the control coater, and the micrometer-adjustable blade was set to 200 micrometers and attached to the instrument. At a distance of about 0.5 cm from the blade, the polymer blend solution was poured to form a line about 6-8 mm wide. The coater was turned on, causing to blade to move forward at a reproducible rate (setting 4). The blade was then removed and the glass was immediately immersed in a bath of deionized water. After approximately 10 minutes, the membrane, which was detached from the glass, was moved into another water bath, where it was kept for 24 hours. The membranes were annealed in a water bath at 90° C. for 4 hours to enhance surface segregation.

FIG. 12 shows SEM micrographs of this membrane. It can be observed that the membrane was highly asymmetric, and the microvoids below its surface were highly elongated and tubular. This morphology may contribute to the fouling resistance of the membrane, which may allow the non-adsorbed proteins to be swept away or otherwise removed, e.g., by the flow of water.

As a control, similar membranes were made using PAN only. In this case, a solution of PAN (1.2 g) in DMF (8.8 ml) was used as the casting solution, and the procedure above was followed. These membranes were not annealed.

Example 11

Fouling Resistance of PAN-g-PEO Containing UF Membranes

Figure 13:
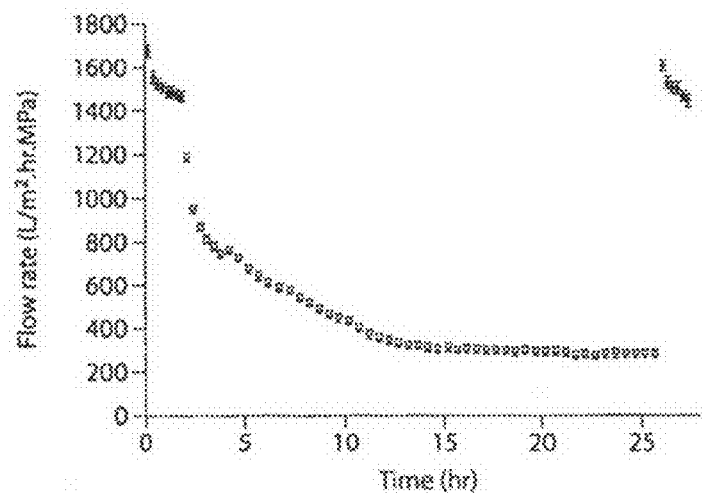
FIG. 13. Dead-end filtration of BSA through a PAN-g-PEO/PAN blend UF membrane, according to another embodiment of the invention. The feed solution was 1 g/L bovine serum albumin in phosphate buffered saline. ♦ (diamonds) are BSA; ■ (squares) are Milli-Q deionized water.

In this example, the PAN/PAN-g-PEO blended UF membrane described in Example 10 was tested for fouling. The procedure for this test was that described in Example 7. By UV-visible spectroscopy, the retention of BSA by the membrane was determined to be 87%. A plot of flux versus time for this fouling experiment is given in FIG. 13. It can be observed that the pure water flux through the membrane was fully recovered upon switching back to pure water as the feed solution. These results demonstrated that negligible irreversible fouling occurred on the surface or internal pores of PAN-g-PEO-modified membranes.

Figure 14:
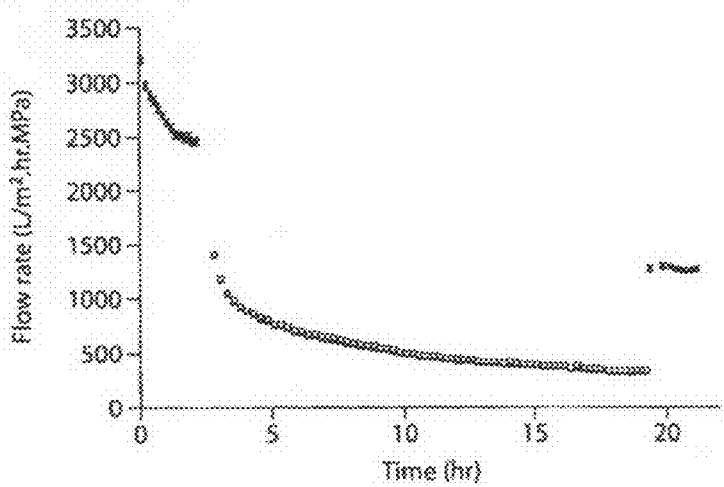
FIG. 14. Dead-end filtration of BSA through a cast PAN UF membrane, in one embodiment of the invention. The feed solution was 1 g/L bovine serum albumin in phosphate buffered saline. ♦ (diamonds) are BSA; ■ (squares) are Milli-Q deionized water.

The filtration of BSA through a commercial PAN membrane, shown in FIG. 9, was performed as a control. A second control experiment was performed using the PAN only membrane described in Example 10. The fouling data of this membrane is given in FIG. 14. It can be observed that the neat PAN membrane irreversibly lost 50% of its initial flux of 2500 L/m$^2$.hr.MPa after 24 hours of fouling, and its final pure water flux was 1250 L/m$^2$.hr.MPa. Thus, the PAN-g-PEO-modified PAN UF membranes outperformed both PAN control membranes in flux recovery.

Those skilled in the art would readily appreciate that all parameters listed herein are meant to be exemplary and that actual parameters will depend upon the specific application for which the methods and apparatus of the present invention may be practiced otherwise than as specifically described. Accordingly, while several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A membrane for liquid filtration comprising:
an amphiphilic graft copolymer having i) a backbone comprising a polyacrylonitrile and ii) a plurality of hydrophilic side chains along the backbone, each of said hydrophilic side chains comprising polyethylene oxide and being provided by one a copolymerized macromonomer having been copolymerized by polymerization of an acrylate group at one chain end of the macromonomer, and the macromonomer having ethylene oxide as a hydrophilic repeat unit, wherein the graft-copolymer is microphase-separated, the hydrophilic side chains are aggregated in nanometer-scale domains interspersed with hydrophobic domains comprising polyacrylonitrile of the backbone, and said amphiphilic graft copolymer adsorbs less than about 20% of protein adsorbed by a corresponding polyacrylonitrile polymer.

2. The membrane of claim 1, wherein the graft copolymer is water insoluble.

3. The membrane of claim 1, wherein the side chains have a number-average molecular weight of at least about 350 g/mol.

4. The membrane of claim 1, wherein the hydrophilic side chains form at least about 30 wt % of the graft copolymer.

5. The membrane of claim 1, wherein the hydrophilic domains define transport pathways for water.

6. The membrane of claim 1, wherein the microphase-separated graft copolymer comprises a coating on an ultrafiltration or microfiltration base membrane.

7. The membrane of claim 6, wherein the base membrane is a polyacrylonitrile ultrafiltration or microfiltration base membrane.

8. The membrane of claim 6, wherein the membrane has a pure water flux that is at least about 50 L/m$^2$.hr.MPa.

9. The membrane of claim 1 or 6, wherein the membrane has an irreversible pure water flux loss after 24 h dead-end filtration of 1000 mg/L bovine serum albumin solution and rinsing with deionized water that that is less than about 2%.

10. The membrane of claim 6, where the base membrane is selected from the group consisting of polyacrylonitrile, poly(vinylidene fluoride), polysulfone, poly(ether sulfone), poly(aryl sulfone), poly(methyl methacrylate), polypropylene, and copolymers thereof.

11. The membrane of claim 1, wherein the hydrophilic domains have a mean diameter of less than about 3 nm.

12. The membrane of claim 1, wherein the membrane is fabricated by immersion precipitation, the microphase-separated graft copolymer forming a selective layer at the membrane surface.

13. The membrane of claim 1, wherein the membrane has a surface and a bulk, the membrane comprising an entangled blend of a first polymer component and a second polymer component, the second polymer component being the graft copolymer, the graft copolymer being present at the surface of the membrane in a ratio of the second polymer component to the first polymer component that is greater than the ratio of the second polymer component to the first polymer component in the bulk of the membrane.

14. The membrane of claim 13, wherein the first polymer is polyacrylonitrile.

15. The membrane of claim 13, wherein the first polymer component is selected from the group consisting of polyacrylonitrile, poly(vinylidene fluoride), polysulfone, poly(ether sulfone), poly(aryl sulfone), poly(methyl methacrylate), polypropylene, and copolymers thereof.

16. The membrane of claim 13, wherein the membrane is fabricated by immersion precipitation.

17. The membrane of claim 16, wherein the microphase-separated graft copolymer comprises a selective layer at the membrane surface, the selective layer of the membrane being porous.

18. The membrane of claim 17, wherein the membrane has an irreversible flux loss after 24 hours of dead-end filtration of 1000 mg/L bovine serum albumin solution and rinsing with deionized water that is less than about 2%.

19. The membrane of claim 13, wherein the second polymer component is at least about 20 wt % of the blend.

20. The membrane of claim 13, wherein the hydrophilic side chains of the graft copolymer comprise polyethylene oxide with a number-average molecular weight of at least about 350 g/mol.

21. A method for water filtration, comprising:
providing a membrane as defined in claim 1; and
passing water through the membrane.

22. A method for molecular fractionation, comprising:
providing a membrane as defined in claim 1; and
filtering molecular solutions through the membrane selective layer to selectively pass molecules on the basis of size.

23. The membrane of claim 1 or 13, wherein the amphiphilic graft copolymer adsorbs less than about 5% of protein adsorbed by a corresponding polyacrylonitrile polymer.

24. The membrane of claim 1 or 13, wherein the amphiphilic graft copolymer is synthesized in a process comprising copolymerizing acrylonitrile with poly(ethylene glycol) methyl ether acrylate.

25. The membrane of claim 13, wherein the membrane adsorbs less than about 20% of protein adsorbed by a corresponding polyacrylonitrile polymer.

26. The membrane of claim 1 or 13, wherein the amphiphilic graft copolymer is synthesized by free radical copolymerizing acrylonitrile with poly(ethylene glycol) methyl ether acrylate.

27. The membrane of claim 1 or 13, wherein the membrane is cast by immersion precipitation and the membrane comprises an asymmetric structure with a dense, 0.1 to 1 micrometer surface layer overlaying a sublayer.

28. A graft copolymer comprising copolymerized acrylonitrile and poly(ethylene glycol) methyl ether acrylate, wherein the graft copolymer is represented by Structural Formula I:

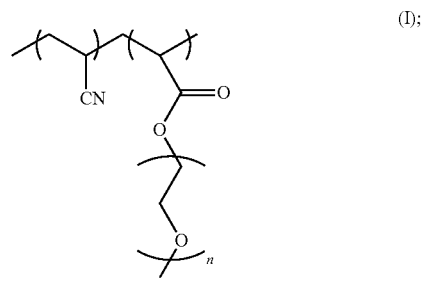

wherein n is 3, 4, 5, 6, 7, 8, 9 or 10.

29. The graft copolymer of claim 28, wherein the graft copolymer is polyacrylonitrile-graft-poly(ethylene glycol).

30. The graft copolymer of claim 28 prepared by a process comprising free radical copolymerizing acrylonitrile with poly(ethylene glycol) methyl ether acrylate.

31. A porous membrane for liquid filtration comprising a graft copolymer of any one of claims 28, 29, or 30.

* * * * *

UNITED STATES PATENT AND TRADEMARK OFFICE
CERTIFICATE OF CORRECTION

PATENT NO. : 8,505,745 B2  
APPLICATION NO. : 12/226121  
DATED : August 13, 2013  
INVENTOR(S) : Anne M. Mayes and Ayse Asatekin Alexiou Page 1 of 1

It is certified that error appears in the above-identified patent and that said Letters Patent is hereby corrected as shown below:

In the Claims:

In Column 17, Claim 1, Line 54, remove the word "a" preceding the word 'polyacrylonitrile'.

In Column 17, Claim 1, Line 57, remove the word "a" preceding the word 'copolymerized'.

Signed and Sealed this  
Nineteenth Day of November, 2013

Teresa Stanek Rea  
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,505,745 B2 | Page 1 of 1 |
| APPLICATION NO. | : 12/226121 | |
| DATED | : August 13, 2013 | |
| INVENTOR(S) | : Mayes et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 724 days.

Signed and Sealed this
Seventeenth Day of February, 2015

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,505,745 B2 | Page 1 of 1 |
| APPLICATION NO. | : 12/226121 | |
| DATED | : August 13, 2013 | |
| INVENTOR(S) | : Mayes et al. | |

It is certified that error appears in the above-identified patent and that said Letters Patent is hereby corrected as shown below:

In the Specification

Please delete the paragraph titled "GOVERNMENT FUNDING" encompassing Column 1, lines 17-24:

"Research leading to various aspects of the present invention were sponsored, at least in part, by the U.S. Navy, grant number N00014-02-1-0343, and the National Science Foundation, grant number CTS0120978. The U.S. Government has certain rights in this invention."

and replace with:

"This invention was made with Government support under Contract No. N00014-02-1-0343 awarded by the Office of Naval Research and under Grant No. CTS0120978 awarded by the National Science Foundation. The Government has certain rights in the invention."

Signed and Sealed this
Thirty-first Day of May, 2016

Michelle K. Lee
*Director of the United States Patent and Trademark Office*